(12) United States Patent
Werner

(10) Patent No.: US 7,147,320 B2
(45) Date of Patent: Dec. 12, 2006

(54) AIMING IMPROVEMENT DEVICE FOR ATTACHING TO GLASSES WORN BY A SHOOTER AND FOR MAXIMIZING DEPTH OF FIELD OF THE SHOOTER, PRESERVING DEPTH PERCEPTION AND BINOCULAR VISION OF THE SHOOTER, AND ELIMINATING PERIPHERAL VISION OF THE SHOOTER

(76) Inventor: Theodore J. Werner, 193 W. Hills Rd., Huntington Station, NY (US) 11746

( * ) Notice: Subject to any disclaimer, the term of this patent is extended or adjusted under 35 U.S.C. 154(b) by 0 days.

(21) Appl. No.: 11/106,984

(22) Filed: Apr. 15, 2005

(65) Prior Publication Data

US 2006/0244900 A1 Nov. 2, 2006

(51) Int. Cl.
*G02C 7/00* (2006.01)
(52) U.S. Cl. .......................................... 351/53; 351/47
(58) Field of Classification Search .................. 351/53, 351/41, 44, 47, 48, 57, 58

See application file for complete search history.

(56) References Cited

U.S. PATENT DOCUMENTS 1,340,579 A * 5/1920 Tousey ........................ 351/53

* cited by examiner

*Primary Examiner*—Huy Mai
(74) *Attorney, Agent, or Firm*—Charles E. Baxley

(57) ABSTRACT

An aiming improvement device for attaching to glasses having lenses and arms and worn by a shooter having a dominant eye and a non-dominant eye and for at least maximizing depth of field of the shooter and preserving depth perception and binocular vision of the shooter. The device includes an opaque aperture-adjusting assembly, a translucent shade, and attaching apparatus. The opaque aperture-adjusting assembly selectively overlies the lens communicating with the dominant eye to maximize the depth of field of the shooter. The translucent shade selectively overlies the lens communicating with the non-dominant eye to preserve the depth perception and the binocular vision of the shooter. The attaching apparatus is attached to, and replaceably attaches, the opaque aperture-adjusting assembly and the translucent shade to the lenses so as to allow them to have an operational position where they overlie the lenses and a non-operational position where they do not overlie the lenses but are still replaceably attached to the glasses.

42 Claims, 4 Drawing Sheets

AIMING IMPROVEMENT DEVICE FOR ATTACHING TO GLASSES WORN BY A SHOOTER AND FOR MAXIMIZING DEPTH OF FIELD OF THE SHOOTER, PRESERVING DEPTH PERCEPTION AND BINOCULAR VISION OF THE SHOOTER, AND ELIMINATING PERIPHERAL VISION OF THE SHOOTER

BACKGROUND OF THE INVENTION

1. Field of the Invention

The present invention relates to an aiming improvement device for attaching to glasses worn by a shooter, and more particularly, the present invention relates to an aiming improvement device for attaching to glasses having a pair of lenses and a pair of arms and worn by a shooter having a dominant eye with an optical axis and a non-dominant eye and for maximizing depth of field of the shooter, preserving depth perception and binocular vision of the shooter, and eliminating peripheral vision of the shooter.

2. Description of the Prior Art

As shown in FIG. 1, which is a diagrammatic side elevational view of an image focusing behind the retina of an eye, as we age, the corneas 10, i.e., lens, of our eyes 12 lose some of their ability to focus causing images 14, that in younger years focused on the retina 16, to now focus behind the retina 16.

We can easily see distant objects, but close objects are out of focus. The common solution is reading glasses. For shooters, however, reading glasses bring cross hairs and iron sights into focus, but the target blurs and red dots tend to lose their shape.

Our eyes do not see everything in sharp focus. There is a zone that extends from the closest point of acceptable sharpness to the most distant. This zone is known as the depth of field.

Photographers have used depth of field manipulation for a long time. When you see a photograph that has a sharp object, but an unclear background, most likely it was taken with a wide aperture of F 1.4. If that same image was taken using a small aperture of F 22, the subject and background would be sharp.

Further, in most, if not all cases, if an individual is born right handed, the right eye will be dominant, and if born left handed, the left eye will be dominant. In many cases, as soon as left handedness is observed in an infant, the parents will influence the child to use the right hand to conform to the practice of the majority of the population. Thus, a substantial number of individuals who appear to be right handed at maturity are innately left handed. Forcibly changing handedness, however, does not produce a corresponding change in eye dominance, so that there are a substantial number of individuals who are cross-dominant. This can be disadvantageous when attempting to perform a function that permits use of only one eye, such as aiming a weapon or looking into a monocular optical instrument. When aiming commonly used weapons such as pistols, shotguns, and rifles, the shooter attempts to set the rear and front sights and the target point in alignment. Most rifles and shotguns are designed for use by right handed shooters, who will rest the butt of the gun stock against their right shoulder and place their right eye behind the rear sight, with the intention of using the right eye exclusively to align the front and rear sights and the target. If the shooter is left eye dominant, the brain influences the left eye to become involved in the sighting and inaccuracy in aiming results. To alleviate this problem to the extent possible, it is common practice for shooters to close the dominant left eye which, of course, results in the brain dictating that the right eye will take control. It is known, particularly among competitive shooters, that shooting with one eye closed has an adverse effect on accuracy. It results in loss of binocular vision, peripheral vision, and depth perception. Loss of any one of these qualities will adversely affect the accuracy of trap shooters, target shooters, or hunters. It is especially important for trap shooters to maintain peripheral vision and depth perception since a shot is fired when the moving clay pigeon or target comes into sight. These three qualities, however, should be preserved in any kind of shooting with a gun or bow and arrow.

Competitive pistol shooters, who shoot at stationary targets, are seriously handicapped by cross-dominance between eyes and hands. The competitive pistol shooter usually holds the pistol out with two arms extended at eye level. Even if the pistol shooter keeps both eyes open while aiming as is desirable, unconsciously, the sight and barrel of the pistol will be turned slightly as a result of the burden of alignment being accepted primarily by the dominant eye. Shooting accuracy, therefore, suffers.

It has also been established that closing one eye while letting the other do the work has adverse physiological effects. The capillary bed that supplies the retina tissue to which the optic nerve connects is beneath the retina so light does not have to pass through blood. When one eye is closed voluntarily or otherwise for a short time, the brain brings about events that result in reduced blood flow to both eyes and this reduces visual acuity of the eye that is open and doing the work. This is another good reason for keeping both eyes open while aiming.

Many individuals among the population, including shooters, are not aware that their eyes and hands are cross-dominant because they have not become aware that it is easy to make the determination. As is known, a test for which eye is dominant simply involves holding a finger or a pencil, for example, upright with the arm fully extended and with both eyes aligning the pencil with a distant object. Then, the right eye can be closed. If, when the right eye is closed the pencil appears to shift out of alignment with the distant object, it was the right eye that was doing most of the work all the time and there is right eye dominance. The other part of the test is to close the left eye. If there is right eye dominance, then there will be no shift. Conversely, if the individual closes the left eye and a shift occurs, it is an indication of left eye dominance. For additional confirmation, the right eye is closed and there will be no shift if there is left eye dominance.

Some shooters have recognized that they have cross-dominance and they attempt to take measures to mitigate the disadvantage. Some shooters, who are left eye dominant, have obtained special weapons, or particularly, had a rifle or shotgun stock made that is adaptable for shooting on the left side so that the left dominant eye can be used. Some left eye dominant shooters will shoot with the butt of the gun stock on the right shoulder and use the weaker or non-dominant right eye for aiming while the left eye is covered with a black patch, or if glasses are used, opaque tape is applied to the left lens. When the lens is covered or the eye is completely overlayered with a patch, it is as if one is shooting with the non-dominant eye closed in which case binocular vision, depth perception, and peripheral vision are lost. In any case, it has been shown that better shooting accuracy is obtained when a shooter masters keeping both eyes open, even if there is no cross-dominance between the eyes and hands. A right eye dominant shooter, for instance, who correctly aims with the right eye and does not need to overcome a problem of cross-dominance, is better off if both eyes are kept open when shooting. Some shooters, who have no cross-dominance, still cannot keep both eyes open because they experience double vision if they do so while aiming. They usually solve this problem by closing the non-dominant eye anyway.

Numerous innovations for aiming improvement devices have been provided in the prior art that will be discussed infra. Even though these innovations may be suitable for the specific individual purposes to which they address, they each differ in structure and/or operation and/or purpose from the present invention, in that they do not teach an aiming improvement device for attaching to glasses having a pair of lenses and a pair of arms and worn by a shooter having a dominant eye with an optical axis and a non-dominant eye and for maximizing depth of field of the shooter, preserving depth perception and binocular vision of the shooter, and eliminating peripheral vision of the shooter.

FOR EXAMPLE, U.S. Pat. No. 4,761,196 issued to Brown et al. on Aug. 2, 1988 teaches a thin flexible disk of opaque material and at least one flexible disk made of a translucent plastic material that is provided in a kit. A shooter aims a weapon, such as a rifle, in the normal fashion with the optical axis of one eye aligned with the rear and front sights on the rifle. While the rifle is being aimed, the other eye, that is, the eye which is not consciously doing any aiming, has the opaque disk applied to the lens of the shooter's glasses. The opaque disk is then moved around until it is aligned with the pupil and on the optical axis of the other eye. A translucent disk is then applied coincidentally with the opaque disk after which the tentatively adhered opaque disk is removed. The shooter then proceeds to shoot with the center of vision of the other eye blanked out, but with diffuse light coming through the translucent disk so the brain governs the other eye as if the eye were operating under ordinary conditions in which case depth perception, peripheral vision, and binocular vision are preserved as is normally the case when an object is sighted with two unoccluded eyes.

ANOTHER EXAMPLE, U.S. Pat. No. 5,305,027 issued to Patterson on Apr. 19, 1994 teaches a vision training device that is useful for improving hand-eye coordination activities and takes the form of eye wear having two red colored, translucent lenses. Each lens contains a clear target sight positioned and dimensioned to allow a trainee to focus the image of an object onto the focal vision areas of his eyes through the apertures, while simultaneously stimulating the red vision of the eye by exposure to light in the red spectrum.

STILL ANOTHER EXAMPLE, U.S. Pat. No. 5,444,501 issued to Aloi et al. on Aug. 22, 1995 teaches a golf sighting spectacle device to be worn by a golfer to aid in sighting the golf ball during a swing. The sighting device is a spectacle including lenses having neutral density filters transmitting 1.5 percent of the visible light and being opaque in the ultraviolet. The sighting device, for the right handed golfer, has a ⅛ inch diameter aperture in the left eyepiece located to the left and below the optical center of the eyepiece. In the version for the left handed golfer, the aperture is in the mirror image of the lens, being to the right and below the optical center, instead of being to the left and below the optical center of the eyepiece.

YET ANOTHER EXAMPLE, U.S. Pat. No. 5,541,675 issued to Hickey on Jul. 30, 1996 teaches a pair of eyeglasses which can be used in conjunction with shooting. The glasses enable a shooter to take proper aim at a target without having to close one eye. In the broadest context, the pair of eyeglasses has one of the lenses opaque and the other lens opaque, with the exception of a small aperture. The aperture is the sighting aperture which enables the shooter to focus on his or her target.

It is apparent that numerous innovations for aiming improvement devices have been provided in the prior art that are adapted to be used. Furthermore, even though these innovations may be suitable for the specific individual purposes to which they address, they would not be suitable for the purposes of the present invention as heretofore described, that is, an aiming improvement device for attaching to glasses having a pair of lenses and a pair of arms and worn by a shooter having a dominant eye with an optical axis and a non-dominant eye and for maximizing depth of field of the shooter, preserving depth perception and binocular vision of the shooter, and eliminating peripheral vision of the shooter.

SUMMARY OF THE INVENTION

ACCORDINGLY, AN OBJECT of the present invention is to provide an aiming improvement device for attaching to glasses having a pair of lenses and a pair of arms and worn by a shooter having a dominant eye with an optical axis and a non-dominant eye and for maximizing depth of field of the shooter, preserving depth perception and binocular vision of the shooter, and eliminating peripheral vision of the shooter that avoids the disadvantages of the prior art.

BRIEFLY STATED, ANOTHER OBJECT of the present invention is to provide an aiming improvement device for attaching to glasses having a pair of lenses and a pair of arms and worn by a shooter having a dominant eye with an optical axis and a non-dominant eye and for at least maximizing depth of field of the shooter and preserving depth perception and binocular vision of the shooter. The aiming improvement device includes an opaque aperture-adjusting assembly, a translucent shade, and attaching apparatus. The opaque aperture-adjusting assembly selectively overlies the lens of the glasses communicating with the dominant eye of the shooter to maximize the depth of field of the shooter. The translucent shade selectively overlies the lens of the glasses communicating with the non-dominant eye of the shooter to preserve the depth perception and the binocular vision of the shooter. The attaching apparatus is attached to, and replaceably attaches, the opaque aperture-adjusting assembly and the translucent shade to the pair of lenses of the glasses so as to allow the opaque aperture-adjusting assembly and the translucent shade to have an operational position where the opaque aperture-adjusting assembly and the translucent shade overlie the pair of lenses of the glasses and a non-operational position where the opaque aperture-adjusting assembly and the translucent shade do not overlie the pair of lenses of the glasses but are still replaceably attached to the glasses.

The novel features which are considered characteristic of the present invention are set forth in the appended claims. The invention itself, however, both as to its construction and its method of operation, together with additional objects and advantages thereof, will be best understood from the following description of the specific embodiment when read and understood in connection with the accompanying drawing.

BRIEF DESCRIPTION OF THE DRAWING

The figures of the drawing are briefly described as follows.

Figure 1:
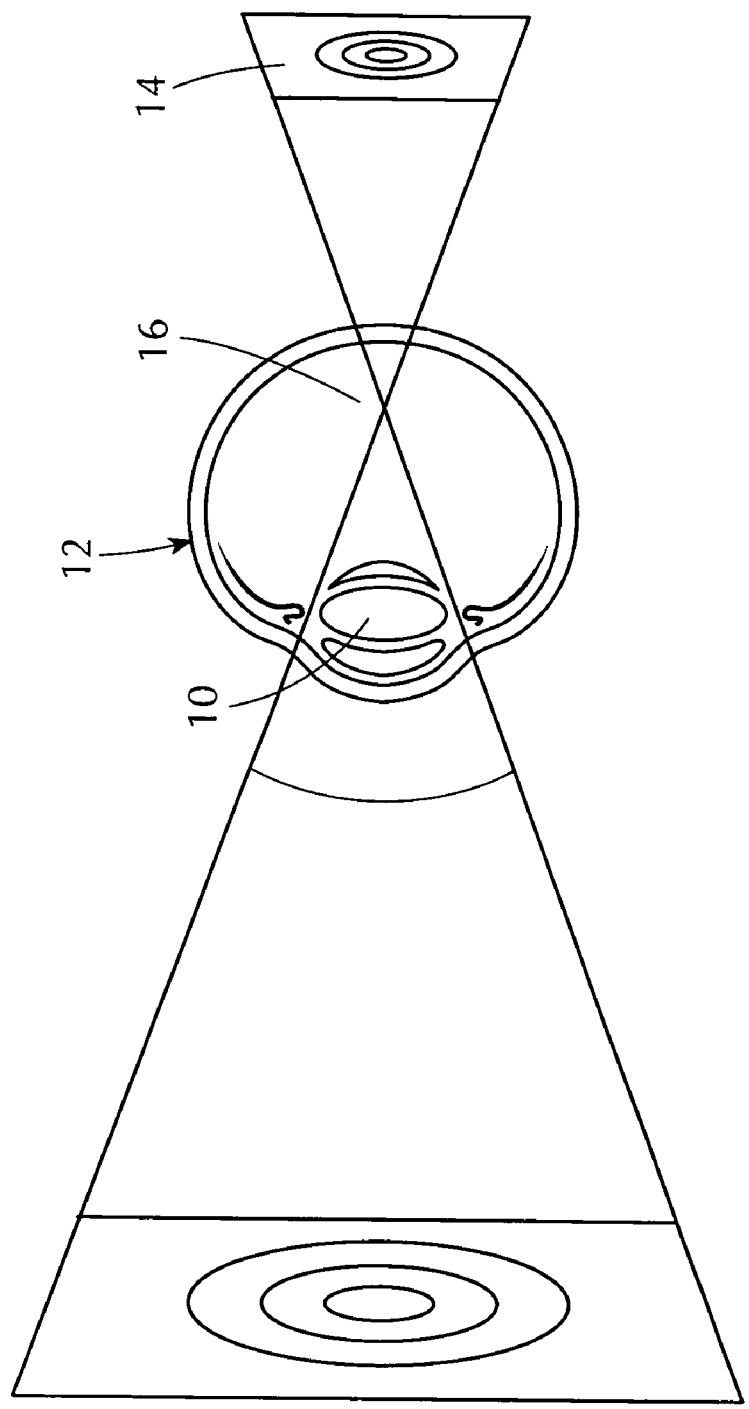
FIG. 1 is a diagrammatic side elevational view of an image focusing behind the retina of an eye.

LIST OF REFERENCE NUMERALS UTILIZED IN THE DRAWING 10 cornea of eye 12
12 eye
14 image
16 retina of eye 12

PRESENT INVENTION 20 aiming improvement device of present invention for attaching to glasses 22 having pair of lenses 24 and a pair of arms 25 and worn by shooter 26 having dominant eye 28 with optical axis and non-dominant eye 30 and for maximizing depth of field of shooter 26, preserving depth perception and binocular vision of shooter 26, and eliminating peripheral vision of the shooter 26
22 glasses
24 pair of lenses of glasses 22
25 pair of arms of glasses 22
26 shooter
27 dominant eye of shooter 26
30 non-dominant eye of shooter 26
32 opaque aperture-adjusting assembly for replaceably and selectively overlying lens 24 of glasses 22 communicating with dominant eye 28 of shooter 26 to maximize depth of field of shooter 26
34 translucent shade for replaceably and selectively overlying lens 24 of glasses 22 communicating with non-dominant eye 30 of shooter 26 to preserve depth perception and binocular vision of shooter 26
36 attaching apparatus for replaceably attaching opaque aperture-adjusting assembly 32 and translucent shade 34 to pair of lenses 24 of glasses 22, respectively, so as to allow opaque aperture-adjusting assembly 32 and translucent shade 34 to have operational position where opaque aperture-adjusting assembly 32 and translucent shade 34 overlie pair of lenses 24 of glasses 22, respectively, and non-operational position where opaque aperture-adjusting assembly 32 and translucent shade 34 do not overlie pair of lenses 24 of glasses 22, respectively, but are still replaceably attached to glasses 22
38 translucent shade of opaque aperture-adjusting assembly 32
40 opaque dial
42 through slot in translucent shade 38 of opaque aperture-adjusting assembly 32 for positioning at optical axis of dominant eye 28 of shooter 26
44 plurality of differently sized through bores in opaque dial 40 of opaque aperture-adjusting assembly 32
46 knob of opaque dial 40 of opaque aperture-adjusting assembly 32
48 pair of sub-assemblies of attaching apparatus 36 for attaching aperture-adjusting assembly 32 and translucent shade 34 to glasses 22, respectively
50 fixed portion of each sub-assembly of pair of sub-assemblies 48 of attaching apparatus 36 for replaceably attaching to associated lens of pair of lenses 24 of glasses 22
52 movable portion of each sub-assembly of pair of sub-assemblies 48 of attaching apparatus 36
54 resilient arms of fixed portion 50 of each sub-assembly of pair of sub-assemblies 48 of attaching apparatus 36 for replaceably capturing associated lens of pair of lenses 24 of glasses 22 there between
56 pair of legs of movable portion 52 of each sub-assembly of pair of sub-assemblies 48 of attaching apparatus 36
58 pair of translucent side shades for replaceably sliding onto pair of arms 25 of glasses 22, respectively, and for eliminating peripheral vision of shooter 26 and peripheral distractions caused thereby, while permitting light to enter there through
60 flat piece of thin semi-rigid material of each translucent side shade of pair of translucent shades 58
62 pair of through slits in flat piece of thin semi-rigid material 60 of each translucent side shade of pair of translucent side shades 58 for slidingly and weavingly receiving associated arm of pair of arms 25 of glasses 22 so as to allow flat piece of thin semi-rigid material 60 of each translucent side shade of pair of translucent side shades 58 to be slidably and weavably replaceable onto associated arm of pair of arms 25 of glasses 22

DETAILED DESCRIPTION OF THE PREFERRED EMBODIMENT

Figure 2:
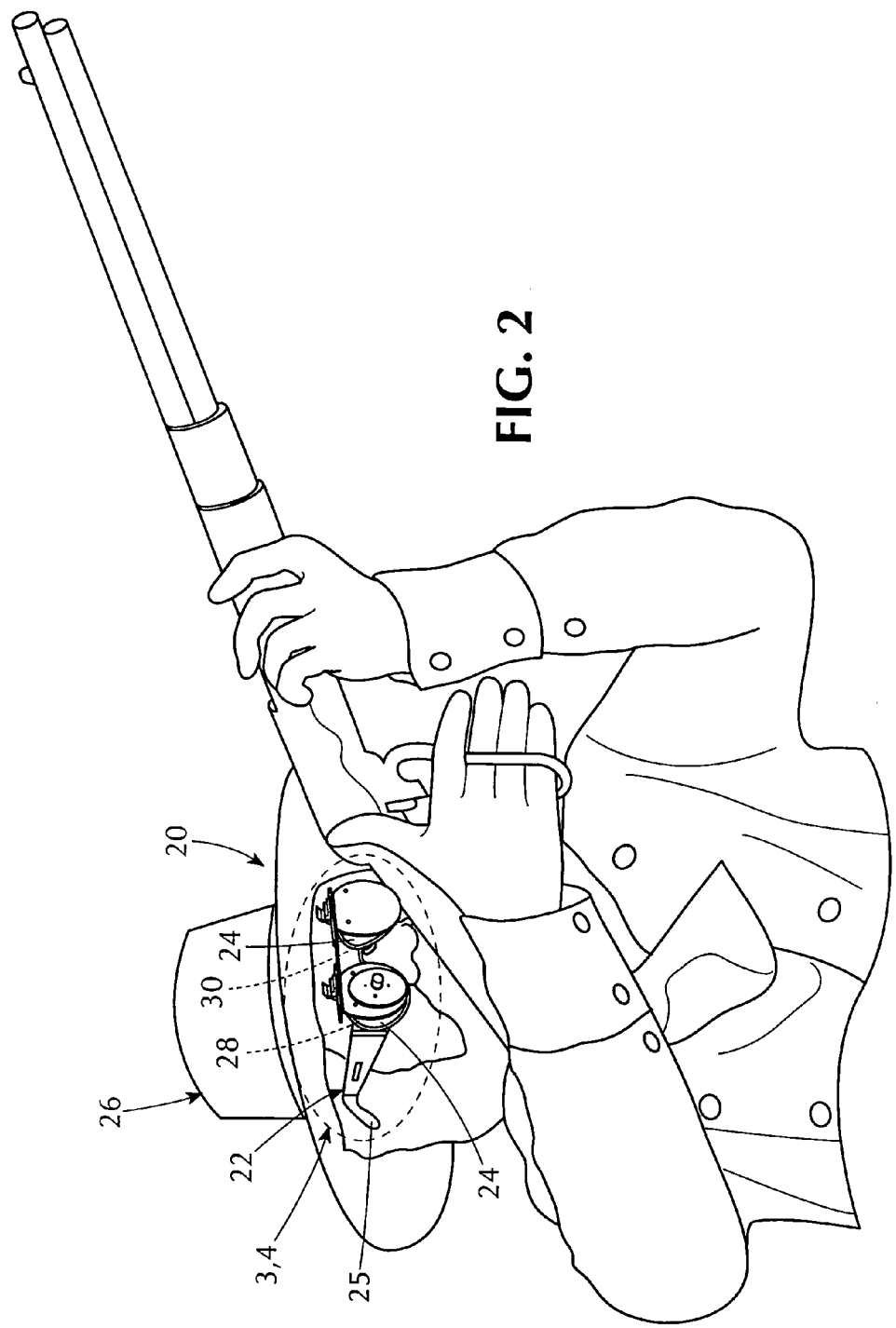
FIG. 2 is a diagrammatic perspective view of the aiming improvement device of the present invention attached to glasses having a pair of lenses and a pair of arms and worn by a shooter having a dominant eye with an optical axis and a non-dominant eye and maximizing depth of field of the shooter, preserving depth perception and binocular vision of the shooter, and eliminating peripheral vision of the shooter.

Referring now to the figures, in which like numerals indicate like parts, and particularly to FIG. 2, which is a diagrammatic perspective view of the aiming improvement device of the present invention attached to glasses having a pair of lenses and a pair of arms and worn by a shooter having a dominant eye with an optical axis and a non-dominant eye and maximizing depth of field of the shooter, preserving depth perception and binocular vision of the shooter, and eliminating peripheral vision of the shooter, the aiming improvement device of the present invention is shown generally at 20 for attaching to glasses 22 having a pair of lenses 24 and a pair of arms 25 and worn by a shooter 26 having a dominant eye 28 with an optical axis and a non-dominant eye 30 and for maximizing depth of field of the shooter 26, preserving depth perception and binocular vision of the shooter 26, and eliminating peripheral vision of the shooter 26.

Figure 3:
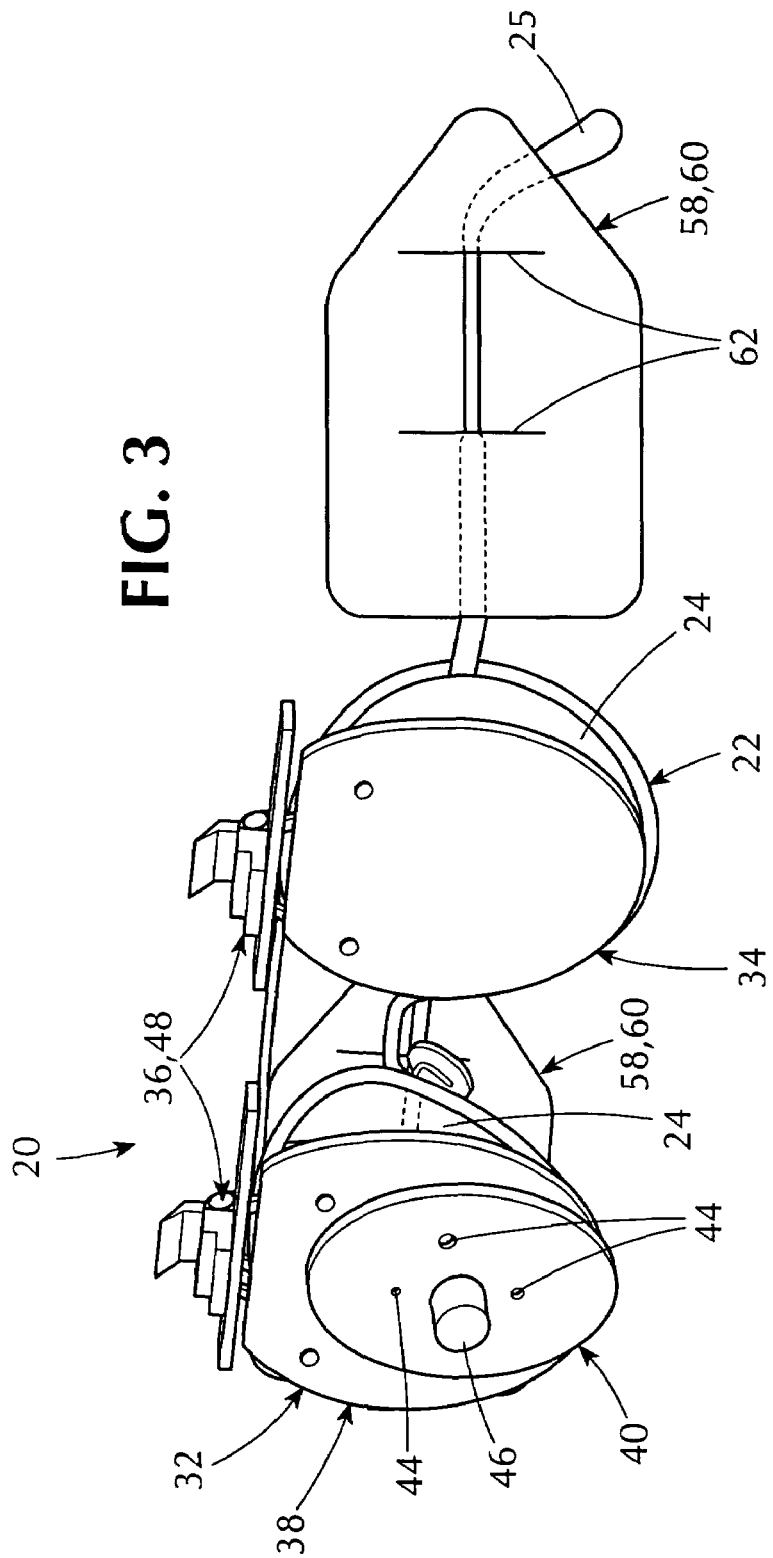
FIG. 3 is an enlarged diagrammatic perspective view of the area generally enclosed by the dotted curve identified by ARROW 3 in FIG. 2 of the aiming improvement device of the present invention in the operational position.
Figure 4:
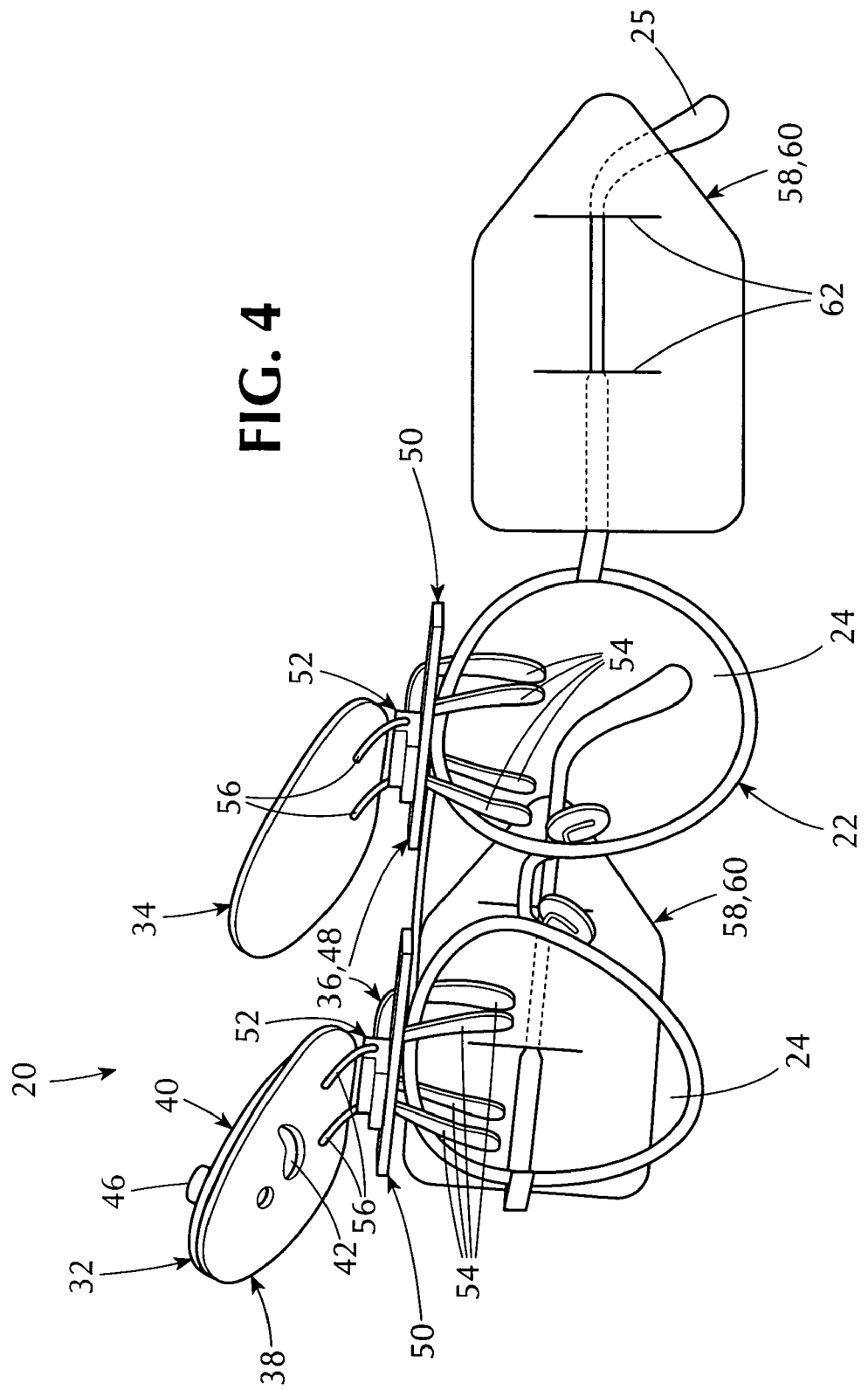
FIG. 4 is an enlarged diagrammatic perspective view of the area generally enclosed by the dotted curve identified by ARROW 4 in FIG. 2 of the aiming improvement device of the present invention in the non-operational position.

The configuration of the aiming improvement device 20 can best be seen in FIGS. 3 and 4, which are, respectively, an enlarged diagrammatic perspective view of the area generally enclosed by the dotted curve identified by ARROW 3 in FIG. 2 of the aiming improvement device of the present invention in the operational position, and, an enlarged diagrammatic perspective view of the area generally enclosed by the dotted curve identified by ARROW 4 in FIG. 2 of the aiming improvement device of the present invention in the non-operational position, and as such, will be discussed with reference thereto.

The aiming improvement device 20 comprises an opaque aperture-adjusting assembly 32, a translucent shade 34, and attaching apparatus 36.

The opaque aperture-adjusting assembly 32 is for replaceably and selectively overlying the lens 24 of the glasses 22 communicating with the dominant eye 28 of the shooter 26 to maximize the depth of field of the shooter 26.

The translucent shade 34 is for replaceably and selectively overlying the lens 24 of the glasses 22 communicating with the non-dominant eye 30 of the shooter 26 to preserve the depth perception and the binocular vision of the shooter by allowing diffused light to come through the translucent shade 34 so that the brain of the shooter 26 governs the non-dominant eye 30 of the shooter 26 as if the non-dominant eye 30 of the shooter 26 were operating under ordinary conditions in which case depth perception and binocular vision are preserved as is normally the case when an object is sighted with two unoccluded eyes.

The attaching apparatus 36 is attached to the opaque aperture-adjusting assembly 32 and the translucent shade 34 and is for replaceably attaching the opaque aperture-adjusting assembly 32 and the translucent shade 34 to the pair of lenses 24 of the glasses 22, respectively, so as to allow the opaque aperture-adjusting assembly 32 and the translucent shade 34 to have an operational position where the opaque aperture-adjusting assembly 32 and the translucent shade 34 overlie the pair of lenses 24 of the glasses 22, respectively, and a non-operational position where the opaque aperture-adjusting assembly 32 and the translucent shade 34 do not overlie the pair of lenses 24 of the glasses 22, respectively, but are still replaceably attached to the glasses 22.

The opaque aperture-adjusting assembly 32 comprises a translucent shade 38 and an opaque dial 40. The translucent shade 38 of the opaque aperture-adjusting assembly 32 has the attaching apparatus 36 attached thereto.

The translucent shade 38 of the opaque aperture-adjusting assembly 32 has a through slot 42 there through. The through slot 42 in the translucent shade 38 of the opaque aperture-adjusting assembly 32 is for positioning at the optical axis of the dominant eye 28 of the shooter 26.

The opaque dial 40 of the opaque aperture-adjusting assembly 32 has a plurality of differently sized through bores 44 there through and spaced there around, and is rotatably attached to the translucent shade 38 of the opaque aperture-adjusting assembly 32, so as to allow a desired through bore 44 in the opaque dial 40 of the opaque aperture-adjusting assembly 32 that maximizes the depth of field of the shooter 26 to communicate with the through slot 42 in the translucent shade 38 of the opaque aperture-adjusting assembly 32 by merely rotating the opaque dial 40 of the opaque aperture-adjusting assembly 32.

The through slot 42 in the translucent shade 38 of the opaque aperture-adjusting assembly 32 is convexo-concave-shaped, i.e., kidney-shaped, relative to rotation of the opaque dial 40 of the opaque aperture-adjusting assembly 32, so as to provide a wider range of communication between it and the desired through bore 44 in the opaque dial 40 of the opaque aperture-adjusting assembly 32.

The opaque dial 40 of the opaque aperture-adjusting assembly 32 has a knob 46. The knob 46 of the opaque dial 40 of the opaque aperture-adjusting assembly 32 extends substantially centrally therefrom, with the plurality of differently sized through bores 44 in the opaque dial 40 of the opaque aperture-adjusting assembly 32 spaced there around, and facilitates rotation of the opaque dial 40 of the opaque aperture-adjusting assembly 32 by allowing the shooter 26 to rotate the opaque dial 40 of the opaque aperture-adjusting assembly 32 until such time that the desired through bore 44 in the opaque dial 40 of the opaque aperture-adjusting assembly 32 that maximizes the depth of field of the shooter 26 communicates with the through slot 42 in the translucent shade 38 of the opaque aperture-adjusting assembly 32.

The translucent shade 34 is similar to the translucent shade 38 of the opaque aperture-adjusting assembly 32.

The attaching apparatus 36 comprises a pair of sub-assemblies 48. The pair of sub-assemblies 48 of the attaching apparatus 36 are separate and identical to each other, with each one thereof being for attaching an associated one of the aperture-adjusting assembly 32 and the translucent shade 34 to the glasses 22.

Each sub-assembly 48 of the attaching apparatus 36 comprises a fixed portion 50 and a movable portion 52. The fixed portion 50 of each sub-assembly 48 of the attaching apparatus 36 is for replaceably attaching to an associated lens 24 of the glasses 22. The movable portion 52 of each sub-assembly 48 of the attaching apparatus 36 is fixedly attached to an associated one of the translucent shade 34 and the translucent shade 38 of the aperture-adjusting assembly 32, and pivotally attached to the fixed portion 50 of an associated sub-assembly 48 of the attaching apparatus 36 so as to allow the opaque aperture-adjusting assembly 32 and the translucent shade 34 to achieve and maintain the operational position thereof where the opaque aperture-adjusting assembly 32 and the translucent shade 34 overlie the pair of lenses 24 of the glasses 22, respectively, and the non-operational position thereof where the opaque aperture-adjusting assembly 32 and the translucent shade 34 do not overlie the pair of lenses 24 of the glasses 22, respectively, by being flipped up but are still replaceably attached to the glasses 22.

The fixed portion 50 of each sub-assembly 48 of the attaching apparatus 36 has resilient arms 54. The resilient arms 54 of the fixed portion 50 of each sub-assembly 48 of the attaching apparatus 36 are for replaceably capturing an associated lens 24 of the glasses 22 there between.

The movable portion 52 of each sub-assembly 48 of the attaching apparatus 36 has a pair of legs 56. The pair of legs 56 of the movable portion 52 of each sub-assembly 48 of the attaching apparatus 36 are fixedly attached to an associated one of the translucent shade 34 and the translucent shade 38 of the aperture-adjusting assembly 32.

The aiming improvement device 20 further comprises a pair of translucent side shades 58. The pair of translucent side shades 58 are for replaceably sliding and weaving onto the pair of arms 25 of the glasses 22, respectively, and are for eliminating peripheral vision of the shooter 26 and peripheral distractions caused thereby while permitting light to enter there through.

Each translucent side shade 58 is a flat piece of thin semi-rigid material 60. The flat piece of thin semi-rigid material of each translucent side shade 58 has a pair of through slits 62 there through for slidingly and weavingly receiving an associated arm 25 of the glasses 22 so as to allow the flat piece of thin semi-rigid material 60 of each translucent side shade 58 to be slidably and weaveably replaceable onto the associated arm 25 of the glasses 22.

The pair of through slits 62 in the flat piece of thin semi-rigid material 60 of each translucent side shade 58 are parallel to each other, laterally-oriented, and spaced longitudinally there along.

The aiming improvement device 20 further comprises a case. The case stores the glasses 22 with the opaque aperture-adjusting shade 32, the translucent shade 34, and the pair of translucent side shade 58 thereon ready for use.

It will be understood that each of the elements described above, or two or more together, may also find a useful application in other types of constructions differing from the types described above.

While the invention has been illustrated and described as embodied in an aiming improvement device for attaching to glasses having a pair of lenses and a pair of arms and worn by a shooter having a dominant eye with an optical axis and a non-dominant eye and for maximizing depth of field of the shooter, preserving depth perception and binocular vision of the shooter, and eliminating peripheral vision of the shooter, however, it is not limited to the details shown, since it will be understood that various omissions, modifications, substitutions, and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of the invention.

The invention claimed is:

1. An aiming improvement device for attaching to glasses having a pair of lenses and a pair of arms and worn by a shooter having a dominant eye with an optical axis and a non-dominant eye and for at least maximizing depth of field of the shooter and preserving depth perception and binocular vision of the shooter, comprising:
   a) an opaque aperture-adjusting assembly;
   b) a translucent shade; and
   c) attaching apparatus;
   wherein said opaque aperture-adjusting assembly is for replaceably and selectively overlying the lens of the glasses communicating with the dominant eye of the shooter to maximize the depth of field of the shooter;
   wherein said translucent shade is for replaceably and selectively overlying the lens of the glasses communicating with the non-dominant eye of the shooter to preserve the depth perception and the binocular vision of the shooter;
   wherein said attaching apparatus is attached to said opaque aperture-adjusting assembly;
   wherein said attaching apparatus is attached to said translucent shade; and
   wherein said attaching apparatus is for replaceably attaching said opaque aperture-adjusting assembly and said translucent shade to the pair of lenses of the glasses, respectively, so as to allow said opaque aperture-adjusting assembly and said translucent shade to have an operational position where said opaque aperture-adjusting assembly and said translucent shade overlie the pair of lenses of the glasses, respectively, and a non-operational position where said opaque aperture-adjusting assembly and said translucent shade do not overlie the pair of lenses of the glasses, respectively, but are still replaceably attached to the glasses.

2. The device as defined in claim 1, wherein said opaque aperture-adjusting assembly comprises a translucent shade; and
   wherein said opaque aperture-adjusting assembly comprises an opaque dial.

3. The device as defined in claim 2, wherein said translucent shade of said opaque aperture-adjusting assembly has said attaching apparatus attached thereto.

4. The device as defined in claim 2, wherein said translucent shade of said opaque aperture-adjusting assembly has a through slot there through; and
   wherein said through slot in said translucent shade of said opaque aperture-adjusting assembly is for positioning at the optical axis of the dominant eye of the shooter.

5. The device as defined in claim 4, wherein said opaque dial of said opaque aperture-adjusting assembly has a plurality of differently sized through bores there through; and
   wherein said plurality of differently sized through bores are spaced around said opaque dial of said opaque aperture-adjusting assembly.

6. The device as defined in claim 5, wherein said opaque dial of said opaque aperture-adjusting assembly is rotatably attached to said translucent shade of said opaque aperture-adjusting assembly so as to allow a desired through bore in said opaque dial of said opaque aperture-adjusting assembly that maximizes the depth of field of the shooter to communicate with said through slot in said translucent shade of said opaque aperture-adjusting assembly by merely rotating said opaque dial of said opaque aperture-adjusting assembly.

7. The device as defined in claim 6, wherein said through slot in said translucent shade of said opaque aperture-adjusting assembly is convexo-concave-shaped relative to rotation of said opaque dial of said opaque aperture-adjusting assembly so as to provide a wider range of communication between it and said desired through bore in said opaque dial of said opaque aperture-adjusting assembly.

8. The device as defined in claim 6, wherein said opaque dial of said opaque aperture-adjusting assembly has a knob; and
   wherein said knob of said opaque dial of said opaque aperture-adjusting assembly facilitates rotation of said opaque dial of said opaque aperture-adjusting assembly by allowing the shooter to rotate said opaque dial of said opaque aperture-adjusting assembly until such time that said desired through bore in said opaque dial of said opaque aperture-adjusting assembly that maximizes the depth of field of the shooter communicates with said through slot in said translucent shade of said opaque aperture-adjusting assembly.

9. The device as defined in claim 8, wherein said knob of said opaque dial of said opaque aperture-adjusting assembly extends substantially centrally therefrom; and
   wherein said plurality of differently sized through bores in said opaque dial of said opaque aperture-adjusting assembly are spaced around said knob of said opaque dial of said opaque aperture-adjusting assembly.

10. The device as defined in claim 2, wherein said translucent shade is similar to said translucent shade of said opaque aperture-adjusting assembly.

11. The device as defined in claim 2, wherein said attaching apparatus comprises a pair of sub-assemblies.

12. The device as defined in claim 11, wherein said pair of sub-assemblies of said attaching apparatus are separate from each other;
   wherein said pair of sub-assemblies of said attaching apparatus are identical to each other; and
   wherein each sub-assembly of said attaching apparatus is for attaching an associated one of said aperture-adjusting assembly and said translucent shade to the glasses.

13. The device as defined in claim 11, wherein each sub-assembly of said attaching apparatus comprises a fixed portion;

wherein each sub-assembly of said attaching apparatus comprises a movable portion; and wherein said fixed portion of each sub-assembly of said attaching apparatus is for replaceably attaching to an associated lens of the glasses.

14. The device as defined in claim 13, wherein said movable portion of each sub-assembly of said attaching apparatus is fixedly attached to an associated one of said translucent shade and said translucent shade of said aperture-adjusting assembly; and wherein said movable portion of each sub-assembly of said attaching apparatus is pivotally attached to said fixed portion of an associated sub-assembly of said attaching apparatus so as to allow said opaque aperture-adjusting assembly and said translucent shade to achieve and maintain said operational position thereof where said opaque aperture-adjusting assembly and said translucent shade overlie the pair of lenses of the glasses, respectively, and said non-operational position thereof where said opaque aperture-adjusting assembly and said translucent shade do not overlie the pair of lenses of the glasses, respectively, by being flipped up but are still replaceably attached to the glasses.

15. The device as defined in claim 13, wherein said fixed portion of each sub-assembly of said attaching apparatus has resilient arms; and wherein said resilient arms of said fixed portion of each sub-assembly of said attaching apparatus are for replaceably capturing an associated lens of the glasses there between.

16. The device as defined in claim 13, wherein said movable portion of each sub-assembly of said attaching apparatus has a pair of legs.

17. The device as defined in claim 16, wherein said pair of legs of said movable portion of each sub-assembly of said attaching apparatus are fixedly attached to an associated one of said translucent shade and said translucent shade of said aperture-adjusting assembly.

18. The device as defined in claim 1, further comprising the glasses.

19. The device as defined in claim 1, further comprising a pair of translucent side shades;

wherein said pair of translucent side shades are for replaceably sliding and weaving onto the pair of arms of the glasses, respectively; and wherein said pair of translucent side shades are for eliminating peripheral vision of the shooter and peripheral distractions caused thereby while permitting light to enter there through.

20. The device as defined in claim 19, wherein each translucent side shade is a flat piece of thin semi-rigid material.

21. The device as defined in claim 20, wherein said flat piece of thin semi-rigid material of each translucent side shade has a pair of through slits there through; and wherein said pair of through slits in said flat piece of thin semi-rigid material of each translucent side shade are for slidingly and weavingly receiving an associated arm of the glasses so as to allow said flat piece of thin semi-rigid material of each translucent side shade to be slidably and weaveably replaceable onto the associated arm of the glasses.

22. An aiming improvement device for attaching to glasses having a pair of lenses and a pair of arms and worn by a shooter having a dominant eye with an optical axis and a non-dominant eye and for maximizing depth of field of the shooter, preserving depth perception and binocular vision of the shooter, and eliminating peripheral vision of the shooter, comprising:

a) first means for maximizing the depth of field of the shooter;

b) second means for preserving the depth perception and the binocular vision of the shooter;

c) third means for eliminating the peripheral vision of the shooter and peripheral distractions caused thereby; and d) fourth means for replaceably attaching said first means and said second means to the pair of lenses of the glasses, respectively, so as to allow said first means and said second means to have an operational position where said first means and said second means overlie the pair of lenses of the glasses, respectively, and a non-operational position where said first means and said second means do not overlie the pair of lenses of the glasses, respectively, but are still replaceably attached to the glasses.

23. The device as defined in claim 22, wherein said first means includes an opaque aperture-adjusting assembly;

wherein said opaque aperture-adjusting assembly comprises a translucent shade; and wherein said opaque aperture-adjusting assembly comprises an opaque dial.

24. The device as defined in claim 23, wherein said translucent shade of said opaque aperture-adjusting assembly has said fourth means attached thereto.

25. The device as defined in claim 23, wherein said translucent shade of said opaque aperture-adjusting assembly has a through slot there through; and wherein said through slot in said translucent shade of said opaque aperture-adjusting assembly is for positioning at the optical axis of the dominant eye of the shooter.

26. The device as defined in claim 25, wherein said opaque dial of said opaque aperture-adjusting assembly has a plurality of differently sized through bores there through; and wherein said plurality of differently sized through bores are spaced around said opaque dial of said opaque aperture-adjusting assembly.

27. The device as defined in claim 26, wherein said opaque dial of said opaque aperture-adjusting assembly is rotatably attached to said translucent shade of said opaque aperture-adjusting assembly so as to allow a desired through bore in said opaque dial of said opaque aperture-adjusting assembly that maximizes the depth of field of the shooter to communicate with said through slot in said translucent shade of said opaque aperture-adjusting assembly by merely rotating said opaque dial of said opaque aperture-adjusting assembly.

28. The device as defined in claim 27, wherein said through slot in said translucent shade of said opaque aperture-adjusting assembly is convexo-concave-shaped relative to rotation of said opaque dial of said opaque aperture-adjusting assembly so as to provide a wider range of communication between it and said desired through bore in said opaque dial of said opaque aperture-adjusting assembly.

29. The device as defined in claim 27, wherein said opaque dial of said opaque aperture-adjusting assembly has a knob; and wherein said knob of said opaque dial of said opaque aperture-adjusting assembly facilitates rotation of said opaque dial of said opaque aperture-adjusting assembly by allowing the shooter to rotate said opaque dial of said opaque aperture-adjusting assembly until such time that said desired through bore in said opaque dial of said opaque aperture-adjusting assembly that maximizes the depth of field of the shooter communicates with said through slot in said translucent shade of said opaque aperture-adjusting assembly.

30. The device as defined in claim 29, wherein said knob of said opaque dial of said opaque aperture-adjusting assembly extends substantially centrally therefrom; and wherein said plurality of differently sized through bores in said opaque dial of said opaque aperture-adjusting assembly are spaced around said knob of said opaque dial of said opaque aperture-adjusting assembly.

31. The device as defined in claim 23, wherein said second means is a translucent shade; and wherein said translucent shade is similar to said translucent shade of said opaque aperture-adjusting assembly.

32. The device as defined in claim 31, wherein said fourth means includes a pair of sub-assemblies.

33. The device as defined in claim 32, wherein said pair of sub-assemblies are separate from each other;

wherein said pair of sub-assemblies are identical to each other; and wherein each sub-assembly is for attaching an associated one of said aperture-adjusting assembly and said translucent shade to the glasses.

34. The device as defined in claim 32, wherein each sub-assembly comprises a fixed portion;

wherein each sub-assembly comprises a movable portion; and wherein said fixed portion of each sub-assembly is for replaceably attaching to an associated lens of the glasses.

35. The device as defined in claim 34, wherein said movable portion of each sub-assembly is fixedly attached to an associated one of said translucent shade and said translucent shade of said aperture-adjusting assembly; and wherein said movable portion of each sub-assembly is pivotally attached to said fixed portion of an associated sub-assembly so as to allow said opaque aperture-adjusting assembly and said translucent shade to achieve and maintain said operational position thereof where said opaque aperture-adjusting assembly and said translucent shade overlie the pair of lenses of the glasses, respectively, and said non-operational position thereof where said opaque aperture-adjusting assembly and said translucent shade do not overlie the pair of lenses of the glasses, respectively, by being flipped up but are still replaceably attached to the glasses.

36. The device as defined in claim 34, wherein said fixed portion of each sub-assembly has resilient arms; and wherein said resilient arms of said fixed portion of each sub-assembly are for replaceably capturing an associated lens of the glasses there between.

37. The device as defined in claim 34, wherein said movable portion of each sub-assembly has a pair of legs.

38. The device as defined in claim 37, wherein said pair of legs of said movable portion of each sub-assembly are fixedly attached to an associated one of said translucent shade and said translucent shade of said aperture-adjusting assembly.

39. The device as defined in claim 22, further comprising the glasses.

40. The device as defined in claim 22, wherein said third means is a pair of translucent side shades;

wherein said pair of translucent side shades are for replaceably sliding and weaving onto the pair of arms of the glasses, respectively; and wherein said pair of translucent side shades are for eliminating the peripheral vision of the shooter and the peripheral distractions caused thereby while permitting light to enter there through.

41. The device as defined in claim 40, wherein each translucent side shade is a flat piece of thin semi-rigid material.

42. The device as defined in claim 41, wherein said flat piece of thin semi-rigid material of each translucent side shade has a pair of through slits there through; and wherein said pair of through slits in said flat piece of thin semi-rigid material of each translucent side shade are for slidingly and weavingly receiving an associated arm of the glasses so as to allow said flat piece of thin semi-rigid material of each translucent side shade to be slidably and weaveably replaceable onto said associated arm of the glasses.

* * * * *